UNITED STATES PATENT OFFICE.

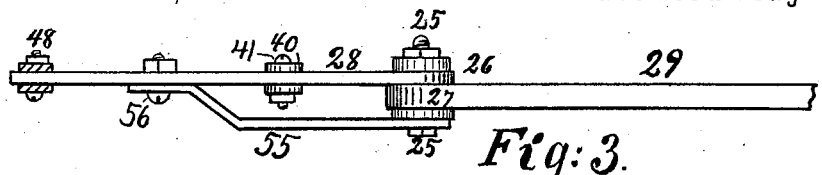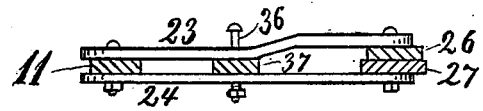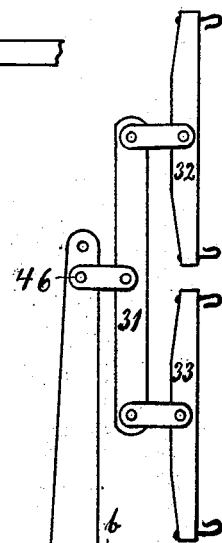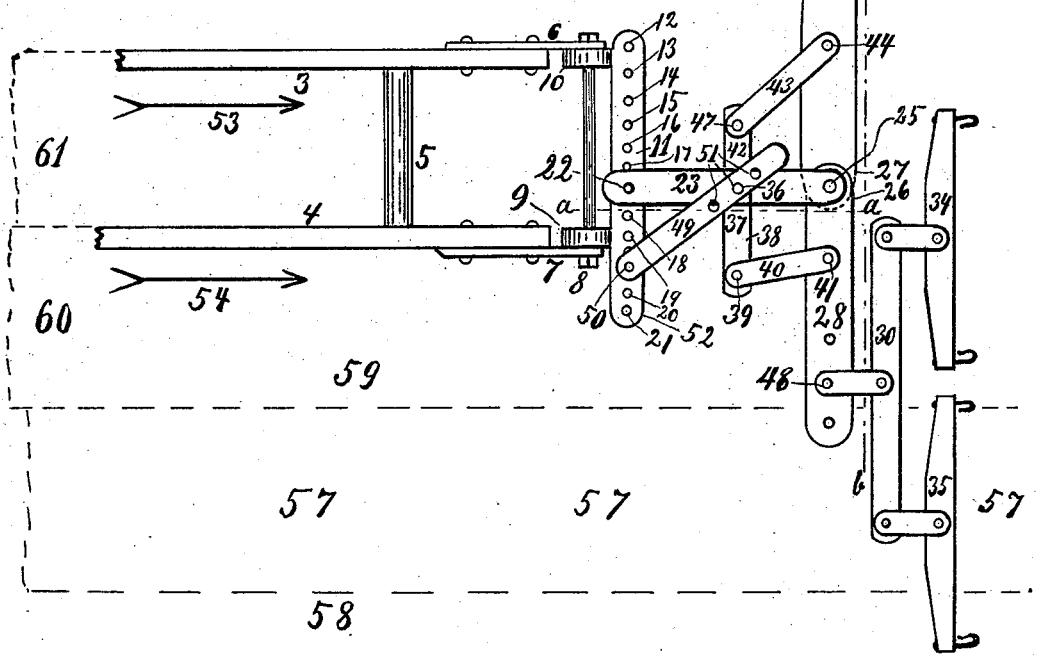

FERDINAND A. POLKA, OF OAKES, NORTH DAKOTA.

DRAFT-EQUALIZER.

SPECIFICATION forming part of Letters Patent No. 539,084, dated May 14, 1895.

Application filed December 26, 1894. Serial No. 533,003. (No model.)

*To all whom it may concern:*

Be it known that I, FERDINAND A. POLKA, a citizen of the United States, residing at Oakes, in the county of Dickey and State of North Dakota, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in draft-equalizers.

The broad and complicated object of my invention is to provide a draft-equalizer adapted to be attached to a gang plow in the central line of the draft or resistance of the gang, and to be drawn by four horses, walking abreast, three of them on the unplowed land, and one of them between the plowed and the solid land, thus obviating the side-draft of the plows caused by the mold boards, which are usually located beyond one side of the plow beam and tend to steer the plows to that side, and at the same time obviating the great disadvantage of having any of the horses walk on the plowed land.

It will be observed that in the equalizers heretofore used a central draft of a gang plow has only been obtainable by placing one or more of the horses upon the plowed ground and in order to avoid this great objection the equalizer has been attached to the gang plow at a point tending to increase the side draft caused by the mold boards and the increased side-draft has had to be resisted by the use of a long pole and neck yokes or else by having the horses walk almost sidewise and spend much of their power in overcoming the side-draft of the plows, besides the waste of power caused by the unnatural mode of walking.

I attain my object and overcome the above named difficulties by the novel construction and arrangement of parts illustrated in the accompanying drawings, in which—

Figure 1 is a plan view of my draft-equalizer attached to the front portion of a gang of two plows secured together in the usual manner. The singletrees and doubletrees are in this view shortened some in order to get room for them on the drawings. In practice they may be made longer, or the evener-bar may be made shorter, so that the two teams come closer together. Fig. 2 is a sectional side view near the line *a a* in Fig. 1. Fig. 3 is a partly-sectional front view, as on the line *b b* in Fig. 1.

Referring to the drawings by reference numerals 3 and 4 are the front portions of the beams of two plows which are secured together by the brace 5, and other braces (not shown) farther back in the plows, and constitute what is termed a gang plow.

6, and 7, are metallic straps by which the plow beams are pivotally secured on the bolt 8, passed through them and through the ears 9, and 10, of the clevis 11, which is provided with a series of holes 12, 13, 14, 15, 16, 17, 18, 19, 20 and 21. In one of these holes I place the bolt 22, by which I secure to the clevis the rear end of the draft bar 23, which consists of an upper bar 23, and a lower bar 24 (as best shown in Fig. 2), and between the front ends of which are pivotally secured on the bolt 25 the overlapping ends 26 and 27, of the short bar section 28, and the long bar section 29, which together make up the evener bar, to the outer ends of which are secured the two double-trees 30, and 31, carrying the four single-trees 32, 33, 34, and 35, to which may be hitched four horses. Between the draft bars 23, and 24, is pivoted at 36, the two-armed lever 37, of which the arm 38, is the longer, and has at 39 pivoted to its end the link 40, of which the front end is pivoted at 41 to the section 28 of the evener bar, a shorter distance from the center line of the draft bar 23, than that between said line and the bolt 39. The other arm 42 of the lever 37, is shorter than the first described arm and is pivotally connected by means of the oblique link 43, to the section 29, of the evener bar at the point 44, which is located so far out on the bar portion 29 that a computation of the distances between the bolts 25 and 44, 44 and 46, 47 and 36, 36 and 39, 25 and 41, 41 and 48, results in the equalizing of the pull of the team at 32, 33, against the team at 34, 35.

49 is a slanting brace secured by the bolt 50, to the clevis 11, usually to the right beyond the beam of the right hand plow. The front end of this brace is provided with several holes 51, of which either one at a time may be secured on the bolt 36, thereby enabling the draft bar 23 to be set and rigidly held in a slanting position either to the right or left or straight forward as in the present instance shown. By the arrangement described it will be seen that the adjustable brace 49, and the draft bar 23, form a rigid connection between the equalizer and the clevis 11, and the gang of plows secured thereto, so that the plows cannot swing on the pivot 22, but are steadied by the draft bar. It will also be observed that while on ordinary gang plows the clevis 11, has its overlapping end 52 projecting beyond the land side of the left-side plow and there, or in front of or near by the end of the left side plow beam is pivoted a small clevis by which connection is made with the double-tree or with the evener bar of some kind of equalizer, I have the said overlapping portion 52, of the clevis 11, extend beyond the mold board side of the beam of the right-hand side plow and the rigid connection made near the front end of the beam of the plow on the right-hand side of the gang.

In the front view Fig. 3 it will be seen that the portion 28, of the evener bar is supported by the brace 55, secured to it at 56, and having its other end pivotally secured upon the bottom end of the bolt 25. In order to facilitate the explanation and understanding of the principle and operation of this invention I have in Fig. 1, illustrated in dotted lines the space 57, which represents the groove or trench between the plowed land 58, and the unplowed land 59, in which the gang plow is shown as cutting the two new furrows 60, and 61. In operation it will thus be seen that the horse farthest to the right or at 35, walks on the bottom of the trench 57, and the other three horses walk on the solid land. For medium sized plows the resisting points or centers of draft are located about where indicated by the arrows 53, and 54, and the common line of draft for the two plows runs centrally between said arrows and through the center of the draft bar 23, thus avoiding the side draft of the plows. If a plow is extra large or small the bolts 22 and 50, are moved either to the right or to the left upon the clevis 11, to the center of resistance. If the distances between the holes 12, 13, 14, to 21, differ in different plows the rear end of the brace 49, may be adjusted at a different proximity to the rear end of the draft bar 23, and should such moving throw the draft bar more than desired out of its right angular position to the clevis 11, then the bolt 36, may be placed in a different one of the holes 51, of the brace 60 and thus retain as much as possible the bar 23 at right angles with the clevis 11, as that is the best position of these parts. The slanting of the draft bar to the right or left should only be admitted when so required by the variation of the holes in the clevis 11, or if a gang plow has such extraordinary side draft that it cannot be overcome even by moving the draft bar and brace 49, to the extreme right hand end of the clevis 11, then the draft bar may be braced over to the right with its front end so as to further balance the sid draft.

In most cases the ordinary clevis 11, used on gang plows may simply be reversed with its left-hand end to the right, and will connect properly with my equalizer, but where the clevis fails to fit my equalizer I furnish as a part of my device the clevis 11, substantially of the shape shown.

Having thus described my invention, what I claim, and desire to secure by Letters Patent, is—

The combination with a gang plow of a clevis as 11, provided with the overhanging end portion 52, projecting beyond the moldboard side of the beam of the outer plow, and being provided with a series of holes; a draft bar adapted to be set in horizontal direction at different angles with the clevis rigidly and adjustably secured to the holes of said clevis, the evener bar consisting of the short section 28, and the long section 29, pivoted together, with their adjacent and overlapping ends to the front end of the rigid draft bar, the two-armed lever 37, pivoted to the draft-bar a short distance back of the evener bar, and having its long arm connected to the short section of the evener bar by a link which inclines with its front end toward the draft bar, and its short arm connected with the long section of the evener bar by a link as 43, slanting with its front end away from the draft bar, a double-tree as 30, and two single trees secured thereto, adjustably connected to the outer end of the bar section 28, and a similar double-tree and two single-trees adjustably secured to the outer end of the long bar section 29, and a suitable brace as 55 for supporting the light bar section 28, and its contents, substantially as shown and described and for the purpose set forth.

In testimony whereof I affix my signature in presence of two witnesses.

FERDINAND A. POLKA.

Witnesses:
A. M. CARLSEN,
HAROLD HARRIS.